United States Patent [19]
Maisch et al.

[11] 3,942,087
[45] Mar. 2, 1976

[54] TRACK SYSTEM FOR STEERED, UNTRACK VEHICLES

[75] Inventors: Wolfgang Maisch, Schwieberdingen; Erich Rubel, Burgstall, both of Germany

[73] Assignee: Robert Bosch G.m.b.H., Gerlingen-Schillerhohe, Germany

[22] Filed: July 29, 1974

[21] Appl. No.: 492,523

[30] Foreign Application Priority Data
Sept. 3, 1973  Germany............................ 2344293

[52] U.S. Cl.................................. 318/587; 318/635
[51] Int. Cl.²............................................ G05D 1/00
[58] Field of Search............................ 318/587, 635

[56] References Cited
UNITED STATES PATENTS

| | | | |
|---|---|---|---|
| 3,160,880 | 12/1964 | Aires................... | 318/635 X |
| 3,201,675 | 8/1965 | Curran et al.......... | 318/635 X |
| 3,431,475 | 3/1969 | Wesner................. | 318/635 X |
| 3,510,737 | 5/1970 | Brown et al. ......... | 318/635 X |
| 3,633,088 | 1/1972 | Kupersmith........... | 318/635 X |
| 3,643,073 | 2/1972 | Sawamura............. | 318/635 X |
| 3,701,992 | 10/1972 | Allen.................... | 318/635 X |
| 3,758,838 | 9/1973 | Wright.................. | 318/635 X |
| 3,787,726 | 1/1974 | Krapp................... | 318/587 |

Primary Examiner—Robert K. Schaefer
Assistant Examiner—John J. Feldhaus
Attorney, Agent, or Firm—Flynn & Frishauf

[57] ABSTRACT

To prevent sudden and violent control swings in the guidance system of vehicles which are guided in a guide path by sensing an electrical or magnetic field derived from a guide track conductor, which sensed field is evaluated in a servo steering system to maintain a transducer at a given distance from the conductor, a limiter stage is provided to which the steering command signal is applied to limit the command signal to predetermine swings; preferably, a low pass filter is also connected to the transducer output to have the command signal applied thereto, the output of the low pass filter being connected to the limiter stage to permit wide, gradual control swings of the servo system while inhibiting wide, rapid swings.

11 Claims, 2 Drawing Figures

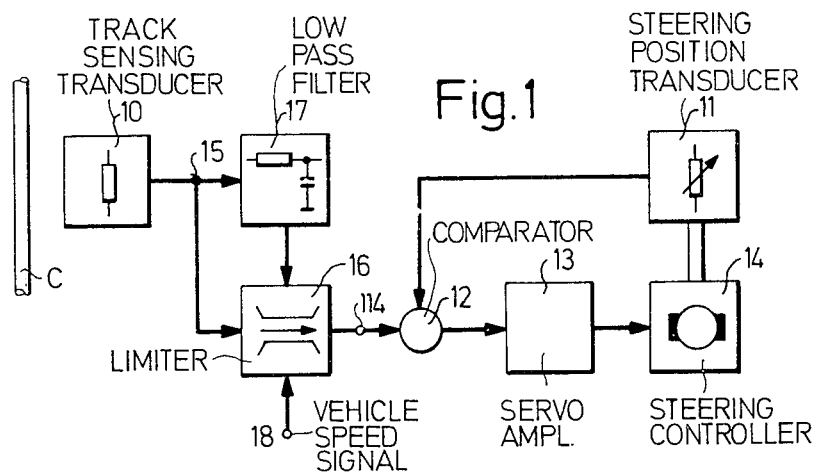
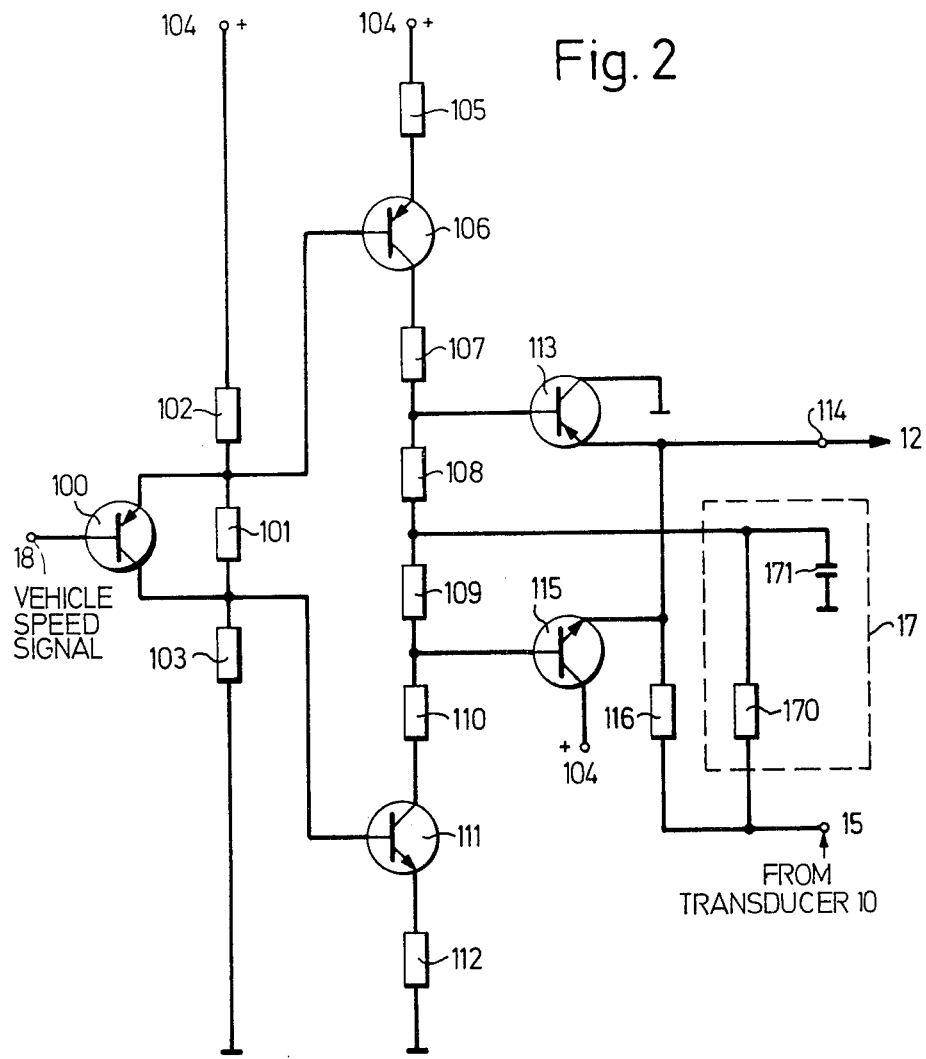

TRACK SYSTEM FOR STEERED, UNTRACK VEHICLES

The present invention relates to a system to guide an untracked, steered vehicle along a guide path, by using an electromagnetic field which is generated by means of a guide conductor, the field being sensed by a transducer mounted on the vehicle which steers the vehicle along the path by sensing deviation of the transducer from the conductor, due to field changes as the transducer separates from the conductor.

The system of guiding vehicles by means of a current-carrying conductor which, for example, is buried or arranged in a predetermined path is known. The sensing transducer is mounted on a vehicle to sense the field from the current carrying conductor and to provide an output signal which is used as a reference or command signal for the position of the vehicle with respect to the conductor. As far as the position of the vehicle with respect to the conductor is concerned, the output from the transducer reflects the actual position of the vehicle, and this output is used in a closed servo loop to control the steering mechanism in such a manner that the error signal, reflecting deviation of the transducer signal, from a position signal of the steering mechanism, becomes 0 or null. Such automatic tracking of track-less vehicles by means of a guide conductor, strung along a guide path is known. Such arrangements, however, have disadvantages. If the vehicle speed is relatively high, the steering control signals, commanding steering changes may occur rapidly, or suddenly, and to such an extent that the vehicle deviates from the path of the guide conductor. Interference, of electrical or magnetic type, spurious or stray or noise signals may, additionally, lead to undesired, uncontrolled steering deflections, so that the vehicle may also lose its sensing relationship to the guide conductor.

It is an object of the present invention to improve a track-less steered vehicle guidance system in such a manner that rapid, extensive steering deflections are avoided.

Subject Matter of the Present Invention

Briefly, command signals are limited to a limiting value by means of a limiter stage incorporated in the control system. In accordance with a feature of the invention, the band width of the limiter stage is matched to the instantaneous speed of the vehicle; as the speed increases, the band width of the limiter stage is made narrower; the limiter stage is, according to a feature of the invention, provided with an input terminal to which a signal representative of speed of the vehicle may be applied, the terminal being internally connected to the limiter stage in such a manner that the band width of the limiter stage is controlled in accordance with the signal applied thereto.

Rapid, extensive steering deflection of the automatic steering system is suppressed. Excessively large steering deflections, or steering deflections angles are avoided even if the control system should fail, so that the vehicle might deviate too far from the guide conductor, in spite of intervention by other safety devices. The permissible steering deflection angle is so influenced that short-time electrical or magnetic interference does not result in undesired steering outputs; such short-time, pulse-type electric or magnetic interference may arise, for example, due to changes in the reinforcement support structure forming the path along which the vehicle is to be guided. As the vehicle speed increases, the danger of sudden extensive steering movement increases, and, in order to avoid such danger, the band widths of the permissible control swings of the control or command signal is limited.

The invention will be described by way of example with reference to the accompanying drawings, wherein:

FIG. 1 is a highly schematic block circuit diagram of a steering and control system for a track-less guided vehicle; and FIG. 2 is a schematic circuit diagram of a limiter stage with a low pass filter.

The electromagnetic field generated by a current carrying conductor C, placed along a predetermined guide path, is sensed by a track sensing transducer 10 (FIG. 1). Track sensing transducer 10, shown only schematically, provides an output signal which forms a command signal, the value of which varies in dependence on the deviation of the transducer, and hence of the vehicle from the guide conductor C. Such a transducer may, for example, include two perpendicularly arranged inductive coils.

The steering system of the vehicle itself includes a steering position transducer 11 which provides an actual steering value, coupled to the steering mechanism of the vehicle. In its simplest form, it may be a potentiometer, the output of which varies in amplitude and sign depending upon the deflection of the wheels, and hence of the steering mechanism, from dead center position. The command signals from transducer 10, and the actual signal from transducer 11 are compared in a comparator 12, the output of which is connected to a servo amplifier 13 which, in turn, controls a steering controller 14 typically a servo motor. Servo amplifier 13 amplifies the error signal derived from comparator 12 and transforms the signal into a wave shape-time distribution suitable to control a steering servo motor 14.

In accordance with the invention, the output signal from track sensing transducer 10, available at a terminal 15 is applied to the comparator 12 over a limiter stage 16, the output from limiter stage 16 being available at terminal 114. Terminal 15, that is the output of the track sensing transducer (which may include an amplifier) is further connected to the input of a low pass filter 17, the output of which is also connected to limiter 16. A terminal 18, on which a signal representative of speed of the vehicle is applied is also connected to limiter 16. A speed signal can readily be provided by a suitable speed or tachometer transducer, not shown.

The command signal is modified in stages 16, 17 which are shown in great detail in FIG. 2. Terminal 18 (FIG. 2) is connected to the base of a pnp transistor 100. A resistor 101 is connected between the emitter-collector path of the transistor 100. The resistor 101, and the emitter-collector path of transistor 100 in parallel therewith, forms the center resistor of a voltage divider further including resistors 102, 103, connected between a positive terminal 104 and chassis or ground. A further voltage divider is provided, connected between terminal 104 and chassis, formed of a resistor 105, the emitter-collector path of a pnp transistor 106, a further voltage divider portion formed of resistors 107, 108, 109, 110, the emitter-collector path of a transistor 111 and a further resistor 112. The control electrodes of the two transistors 106, 111 are connected across the respective terminals of the resistor 101.

The low pass filter 17 includes a resistor 170 and a capacitor 171. Resistor 170 is connected to terminal 15, forming the output of track sensing transducer 10. The other terminal of resistor 170 is connected to the junction between the voltage divider portion resistors 108, 109 and to capacitor 171. The junction between the voltage divider portion formed of resistors 107, 108 is connected to the base of a pnp transistor 113, the collector of which is connected to chassis in the emitter to terminal 114, and hence to the servo comparator. The junction between the resistors 109, 110 of the voltage divider portion is connected to the base of a npn transistor 115, the collector of which is connected to the source or positive potential 104, and the emitter of which is likewise connected to terminal 114, and hence to the servo comparator 12. The emitters of the transistors 113, 115 are connected together and to terminal 15, that is the output from transducer 10, through a resistor 116.

OPERATION

The band width of the limiter stage 16 is determined by a signal provided to terminal 18 connected to the base of transistor 100, and representative of speed of the vehicle. As the vehicle speed rises, the signal also increases. This descreases the conductivity of the main switching path of the transistor 100 and the voltage across resistor 101 will rise. Current flowing through the switching paths of transistors 106, 111 will decrease, since the resistance of the transistors increases as they are controlled to increasing blocking direction. The voltage drop across the voltage divider portion 107 to 110 thus decreases. As the result, the response thresholds of the transistors 113, 115 will shift. If the control voltage at terminal 15, being applied directly over resistor 116 to the terminal 114 and hence to the comparator 12 is within a voltage range which is within the band widths of the limiter, then the voltage is directly applied to the comparator 12. As the voltage at terminal 114 increases, however, that is, upon increasing output from the transducer 10 indicative of increasing deviation of the vehicle from the path of conductor C, a point will be reached at which the transistor 113, becoming increasingly conductive, will short circuit the voltage, thus preventing further rise thereof. The control swing of the signal at terminal 15 has thus been limited in one direction. At the lower limit of the band width, similar relationships will pertain. If the voltage at terminal 114 drops below the base voltage of transistor 115, the transistor 115 becomes increasingly conductive upon further drop of the voltage at terminal 114, and transistor 115 will provide additional power from terminal 104, thus preventing further drop of the signal at terminal 114. The voltage at terminal 114 thus may not drop below a predetermined limit. The upper and the lower limits of the band are determined by the voltage division ratio at the voltage divider resistors 107, 108, 109, 110; this voltage across the resistors 107–110 is, in turn, controlled by the conductivity of the transistors 106, 111 which, in turn, is controlled from the transistor 100, to which the vehicle speed signal is applied.

If a sudden change in the command signal is applied to terminal 15, the voltage at the junction between resistors 108, 109 will rise at a rate determined by the low pass filter 17 but at a slow, gradual rate to shift the entire band upwardly, or downwardly.

The automatic steering control is not interfered with by the device in accordance with the present invention, since it is dangerous to rapidly change the steering deflection at high speeds anyway. Sharp corners can continue to be commanded by the system in accordance with the present invention, provided that the speed at which the sharp corner is taken is low enough, since the deflection angle, or excursion of the deflection system may extend to the mechanical limits thereof.

Various changes and modifications may be made within the scope of the inventive concept.

The conduction of either transistor 113, or 115 (or both) can be sensed, for example by sampling the voltage across a resistor placed in the emitter-collector path of the respective transistor. This conduction is indicative of shifting of the band path range of limiter 16 with respect to signals derived from the vehicle speed signal 18, and independently of signals from low pass filter 17. The rate of change of the band path widths can thus be determined. The signal representative of this rate of change can be used as a control signal to reduce vehicle speed and thus prevent excessive speed in curves. A comparison of this signal with respect to a fixed voltage, for example chassis, provides a measure of the combined effect of vehicle speed and deviation from the conductor C and hence may be used as a measure of the ability of the vehicle to follow a curve path at the then given speed and hence may be used as a command signal to affect a suitable control if the speed should be excessive.

We claim:

1. Guiding system for steered, untracked vehicles having a sensing transducer (10) sensing the field of a guidance conductor (C) located in a guide path, and providing a steering command signal;

a speed signal terminal (18) providing a signal representative of vehicle speed;

and servo steering means (11, 12, 13, 14) responsive to said steering command signal and providing an output steering said vehicle under command of said steering command signal, wherein the servo steering means includes a limiter stage (16) having the steering command signal applied thereto and connected to limit said command signal, said speed signal being connected to said limiter stage (16) to control the limiting band width or range of said limiter stage in accordance with the level of said speed signal representing different vehicle speeds; the different vehicle speeds to narrow the range of control and hence the response range of the servo steering means at high vehicle speeds while providing for a wide range of control and hence high level, extensive response at low vehicle speeds;

and means (17) connected to and controlled by the command signal, and further connected to and controlling said limiter stage (16) to set the half, or center position of the response range, as controlled by the speed signal, of the servo steering means as a function of the command signal.

2. System according to claim 1 wherein the limiter stage (16) comprises two transistors (113, 115), the relative conduction of which defines the upper and lower band width of the limiter;

and control circuit means (107–110) controlled by the vehicle speed signal connected to the control electrodes of said transistors (113, 115) and controlling the conduction thereof and hence the band width of the limiter.

3. System according to claim 2 wherein the control circuit means comprises a voltage divider (107–110).

4. System according to claim 2 wherein the output circuit (114) of said transistors (113, 115) is connected to apply the limited command signal to the servo steering means, one of said transistors (113), upon being controlled to full conduction, effectively connecting said command signal upon increasing amplitude thereof to a source (−104) of predetermined, limited voltage.

5. System according to claim 2 wherein the output circuit (114) of said transistors (113, 115) is connected to apply the limited command signal to the servo steering means, one of said transistors (115), upon being controlled to full conduction, effectively connecting said command signal upon decrease of amplitude, to a source (+104) of predetermined limited voltage.

6. System according to claim 2 wherein the servo steering means comprises a steering position transducer means (11) providing an actual steering signal and comparator means (12) comparing the command signal and the actual signal and providing an error signal;

wherein the output circuits (114) of said transistors (113, 115) are connected to apply a limited command signal to the comparator means (12), one of said transistors (113) upon being controlled to full conduction, effectively connecting said command signal, upon increase in amplitude, to a source (−104) of predetermined limited voltage and the other of said transistors (115) upon being controlled to full conduction, effectively connecting said command signal upon decrease in amplitude to the other terminal of said source (+104) of limited voltage.

7. System according to claim 6 wherein the control circuit means comprises a voltage divider (107–110);

the means to set the half, or center position of the response range comprises a low pass filter (17) connected to have the command signal applied thereto, the output of the low pass filter (17) being connected to half, or center voltage position of the voltage divider so that the command signal from the transducer (10) is applied, directly, to the transistors (113, 115) and through the low pass filter to the voltage divider controlling conduction of said transistors (113, 115);

said system further comprising controlled switch means (100, 106, 111) controlled by said speed signal and connected to said voltage divider (107–110) to change the voltage division ratio thereof and thereby additionally control conduction of said transistors (113, 115) in accordance with said speed signal to prevent change of application of high levels of command signals indicative of rapid changes in the stage, at high speed of the vehicle as indicated by high speed signal levels acting on said controlled switch means.

8. System according to claim 3 wherein the means to set the half, or center position of the response range comprises a low pass filter (17) connected to have the command signal applied thereto, the output of the low pass filter being connected to the half or center voltage position of the voltage divider.

9. System according to claim 1 wherein the limiter stage (16) comprises a control circuit (107–110; 113, 115) having current flowing therein representative of the command signal;

and control switch means (100, 106, 111) controlled by said speed signal and connected to said control circuit and affecting the circuit parameters thereof in accordance with said speed signal to control the band width, or range of said limiter stage in accordance with said speed signal.

10. System according to claim 1, wherein the means to set the half, or center position of the response range comprises a low pass filter (17) connected to have the command signal applied thereto and further connected to the limiter stage to permit gradual, but persistent response of the limiter stage within a narrow range at high vehicle speeds, and rapid response within a wide, extensive range at low vehicle speeds.

11. System according to claim 10 wherein the limiter stage (16) has the command signal applied thereto from the transducer (10) directly, as well as through said low pass filter (17).

* * * * *